United States Patent
Zahdeh et al.

(10) Patent No.: US 9,188,051 B1
(45) Date of Patent: Nov. 17, 2015

(54) SYSTEM AND METHOD OF THERMAL MANAGEMENT FOR AN ENGINE

(71) Applicant: GM GLOBAL TECHNOLOGY OPERATIONS LLC, Detroit, MI (US)

(72) Inventors: Akram R. Zahdeh, Rochester Hills, MI (US); Colin Blacklock Bosman, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/312,731

(22) Filed: Jun. 24, 2014

(51) Int. Cl.
| | |
|---|---|
| *F01N 3/04* | (2006.01) |
| *F01P 3/12* | (2006.01) |
| *F01N 3/02* | (2006.01) |
| *F01P 5/10* | (2006.01) |

(Continued)

(52) U.S. Cl.
CPC .............. *F01P 3/12* (2013.01); *F01N 3/0205* (2013.01); *F01N 3/046* (2013.01); *F01P 3/02* (2013.01); *F01P 5/10* (2013.01); *F01P 7/165* (2013.01); *F02F 1/243* (2013.01); *F02F 1/40* (2013.01); *F01N 13/105* (2013.01); *F01N 13/1866* (2013.01); *F01N 2240/02* (2013.01); *F01N 2260/024* (2013.01); *F01N 2260/10* (2013.01); *F01N 2260/20* (2013.01); *F01N 2390/00* (2013.01); *F01P 2003/021* (2013.01); *F01P 2007/146* (2013.01); *F01P 2060/045* (2013.01); *F01P 2060/16* (2013.01); *F28D 1/0443* (2013.01)

(58) Field of Classification Search
CPC ... F01N 3/046; F01N 13/105; F01N 13/1866; F01N 2240/02; F01N 2260/024; F01N 2260/10; F01N 2260/20; F01N 2390/00; F01P 7/165; F01P 2007/146; F01P 2060/045; F01P 2060/16; F02F 1/243; F02F 1/40; F28D 1/0443
USPC .................... 60/274, 284, 298, 320, 321, 323
See application file for complete search history.

(56) References Cited

U.S. PATENT DOCUMENTS

| | | | | |
|---|---|---|---|---|
| 2008/0314339 | A1* | 12/2008 | Koseki ........................ | 123/41.52 |
| 2009/0308335 | A1* | 12/2009 | Dipaola et al. ............... | 123/41.1 |

(Continued)

OTHER PUBLICATIONS

Conference Paper Entitled: "The new generation of the RF TFSI engine from Audi"; Authors: Heiduk, T.; Dornhofer, R.; Eiser, A.; Grigo, M.; Pelzer, A.; Wurms, R.; Published at: 32nd Internationales Wiener Motorensymposium; Dated: May 5, 2011; Total Pages: 26.

*Primary Examiner* — Jason Shanske
*Assistant Examiner* — Jorge Leon, Jr.
(74) *Attorney, Agent, or Firm* — Quinn Law Group, PLLC

(57) ABSTRACT

An engine thermal management system for a vehicle having an exhaust gas system and an engine with an integrated exhaust manifold and a method for controlling the same are provided. The engine thermal management system may include a coolant pump, an engine water jacket, and a controller. The engine water jacket expels coolant from an IEM coolant outlet, which is directly cast into the integrated exhaust manifold. The coolant flowing through the engine water jacket and expelled from the IEM coolant outlet is in heat exchange relation with a heated exhaust gas flowing through the exhaust gas system, via an engine cylinder head and an exhaust gas septum, to thereby extract heat therefrom, resulting in a heated coolant, which is expelled from the IEM coolant outlet and selectively routed, by the controller, to one of a heater core, an engine oil heat exchanger, a transmission heat exchanger, and a radiator.

17 Claims, 7 Drawing Sheets

(51) Int. Cl.
*F01P 3/02* (2006.01)
*F02F 1/24* (2006.01)
*F01P 7/16* (2006.01)
*F02F 1/40* (2006.01)
*F01N 13/18* (2010.01)
*F01N 13/10* (2010.01)
*F28D 1/04* (2006.01)
*F01P 7/14* (2006.01)

(56) References Cited

U.S. PATENT DOCUMENTS

| | | | |
|---|---|---|---|
| 2010/0083920 A1* | 4/2010 | Kuhlbach | 123/41.82 R |
| 2011/0197832 A1* | 8/2011 | Berkemeier et al. | 123/41.44 |
| 2011/0296834 A1* | 12/2011 | Kuhlbach et al. | 60/605.3 |
| 2012/0227686 A1* | 9/2012 | D'Anna et al. | 123/41.82 R |
| 2013/0055971 A1* | 3/2013 | Brewer et al. | 123/41.82 R |
| 2013/0305708 A1 | 11/2013 | Zandeh et al. | |

* cited by examiner

SYSTEM AND METHOD OF THERMAL MANAGEMENT FOR AN ENGINE

TECHNICAL FIELD

The present teachings relate to a system and method of thermal management for a vehicle having an engine with a dedicated IEM (Integrated Exhaust Manifold) coolant outlet.

BACKGROUND

In a conventional thermal management system for an automotive engine, a cooling circuit circulates a coolant liquid, generally of water and antifreeze. The cooling circuit generally includes a coolant pump powered by the engine crankshaft or electronic control module. The coolant pump propels the coolant liquid through the cooling circuit.

Engine thermal management systems are generally designed to promote engine and coolant liquid warm-up after cold start and to promote engine cooling during normal vehicle operation. The coolant may follow a path through cooling passages in the engine block, through cooling passages in the engine head, and then directly through hoses to a radiator or heater core.

SUMMARY

An engine thermal management system and a method of thermal management for an automotive engine are provided. The vehicle, in which the engine is incorporated, may include an exhaust gas system including a plurality of exhaust gas runners. The engine may include an engine block, a cylinder head, and an integrated exhaust manifold. The integrated exhaust manifold (IEM) includes an IEM coolant outlet integrally cast therein.

The engine thermal management system may include a coolant pump, an engine water jacket, and a controller. The engine water jacket is configured to receive coolant from the coolant pump and expel coolant from the IEM coolant outlet. The engine water jacket may include an engine block cooling jacket, a lower head cooling jacket, and an upper head cooling jacket.

The coolant flowing through the engine water jacket and ultimately expelled from the IEM coolant outlet is in heat exchange relation with the cylinder head of the engine. The cylinder head of the engine is in heat exchange relation with a heated exhaust gas flowing through the exhaust gas system. Thus, the engine water jacket is effectively in heat exchange relation with the heated exhaust gas via the cylinder head. The coolant flowing through the engine water jacket absorbs heat from the heated exhaust gas, via the cylinder head, resulting in a heated coolant to be expelled from the IEM coolant outlet.

The heated coolant expelled from the IEM coolant outlet is selectively routed, via the controller, to one of a heater core to aid in warming the passenger compartment, an engine oil heat exchanger to aid in moderating the temperature of the engine oil, a transmission heat exchanger to aid in moderating the temperature of the transmission, and a radiator to aid in cooling the engine.

The controller has a processor and tangible, non-transitory memory on which is recorded instructions, wherein executing the recorded instructions causes the processor to direct flow of the coolant through the engine thermal management system.

The controller directs flow of the coolant through the thermal management system via the present method, which causes the processor to actuate a plurality of control valves to occupy a fully closed position until the engine reaches a predetermined temperature. The plurality of control valves may include a first flow control valve configured to occupy one of an open position and a closed position, a second flow control valve configured to occupy one of a first, second, third and fourth positions wherein the first position is the closed position, and a third flow control valve configured to occupy one of a first, second, and third position, wherein the first position is the closed position.

The processor may then signal the coolant pump to start and thereby circulate coolant through the thermal management system after the engine reaches a predetermined temperature. The processor may then actuate the second flow control valve to occupy the second position, thereby directing flow of the coolant from the IEM coolant outlet to the engine oil heat exchanger and the transmission heat exchanger to warm each of the engine oil and transmission respectively.

Once the engine oil and the transmission reach a predetermined temperature, the controller may actuate the second flow control valve to occupy the third position, in order to direct coolant expelled from the IEM coolant outlet to the heater core to effectuate the heating of the passenger compartment.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following description and Figures refer to example embodiments and are merely illustrative in nature and not intended to limit the invention, its application, or uses. Referring to the Figures, wherein like reference numbers correspond to like or similar components throughout the several views, an engine thermal management system 10 and a method 200 for controlling the same are provided, and shown generally in a variety of configurations in FIGS. 1-7.

Figure 1:
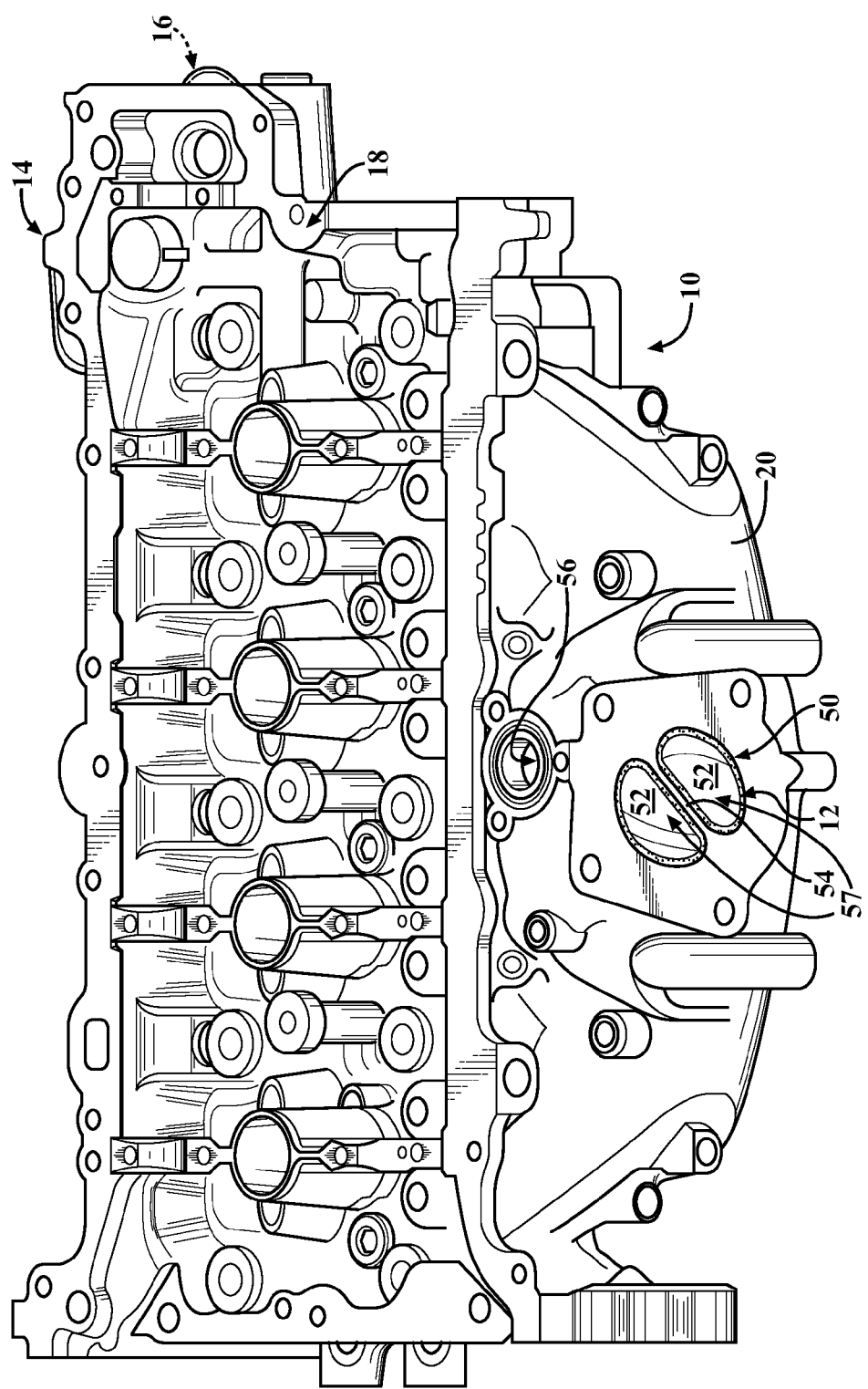
FIG. 1 is a top perspective, schematic view of an automotive engine having an integrated exhaust manifold, wherein the integrated exhaust manifold has an exhaust gas septum, which defines a plurality of exhaust ports, and an IEM coolant outlet, which is cast into the integrated exhaust manifold.

Referring to FIG. 1, the engine thermal management system 10 is designed for use in vehicles having an exhaust gas system 12 and an engine 14. The engine 14 may include an engine block 16, a cylinder head 18, and an integrated exhaust manifold (IEM) 20, wherein the IEM 20 is integrated directly with the engine cylinder head 18, rather than conventional exhaust manifold application, wherein the exhaust manifold is a separate part attached externally to the engine cylinder head 18. The engine 14 may be a naturally aspirated engine with an integrated exhaust manifold 20, or any configuration of a turbo-charged engine with an IEM, for example a dual scroll turbo-charged, 4-cylinder engine with an integrated exhaust manifold.

The IEM coolant outlet 56 is a cast-in IEM coolant outlet 56, which is formed integrally with the integrated exhaust manifold (IEM) 20 via a casting process, i.e., the IEM coolant outlet 56 is cast directly into the IEM 20. The IEM coolant outlet 56 is cast directly into the IEM 20 and located directly thereabove, which allows for maximum exchange of heat from the exhaust gas system 12 to the coolant expelled from the IEM coolant outlet 56.

The exhaust gas system 12 may include a plurality of exhaust gas runners 57, and an exhaust gas outlet 50. The exhaust gas runners 57 are configured to carry a heated exhaust gas 58 through the exhaust gas system 12. The exhaust gas outlet 50 is configured to expel the heated exhaust gas 58. The exhaust gas outlet 50 is integrated with the IEM 20. The exhaust gas outlet 50 may have an exhaust septum 54. The exhaust gas septum 54 may bisect the exhaust gas outlet 50, thereby defining a plurality of exhaust gas ports 52, located where the plurality of exhaust gas runners 57 meet the exhaust gas outlet 50.

Figure 2:
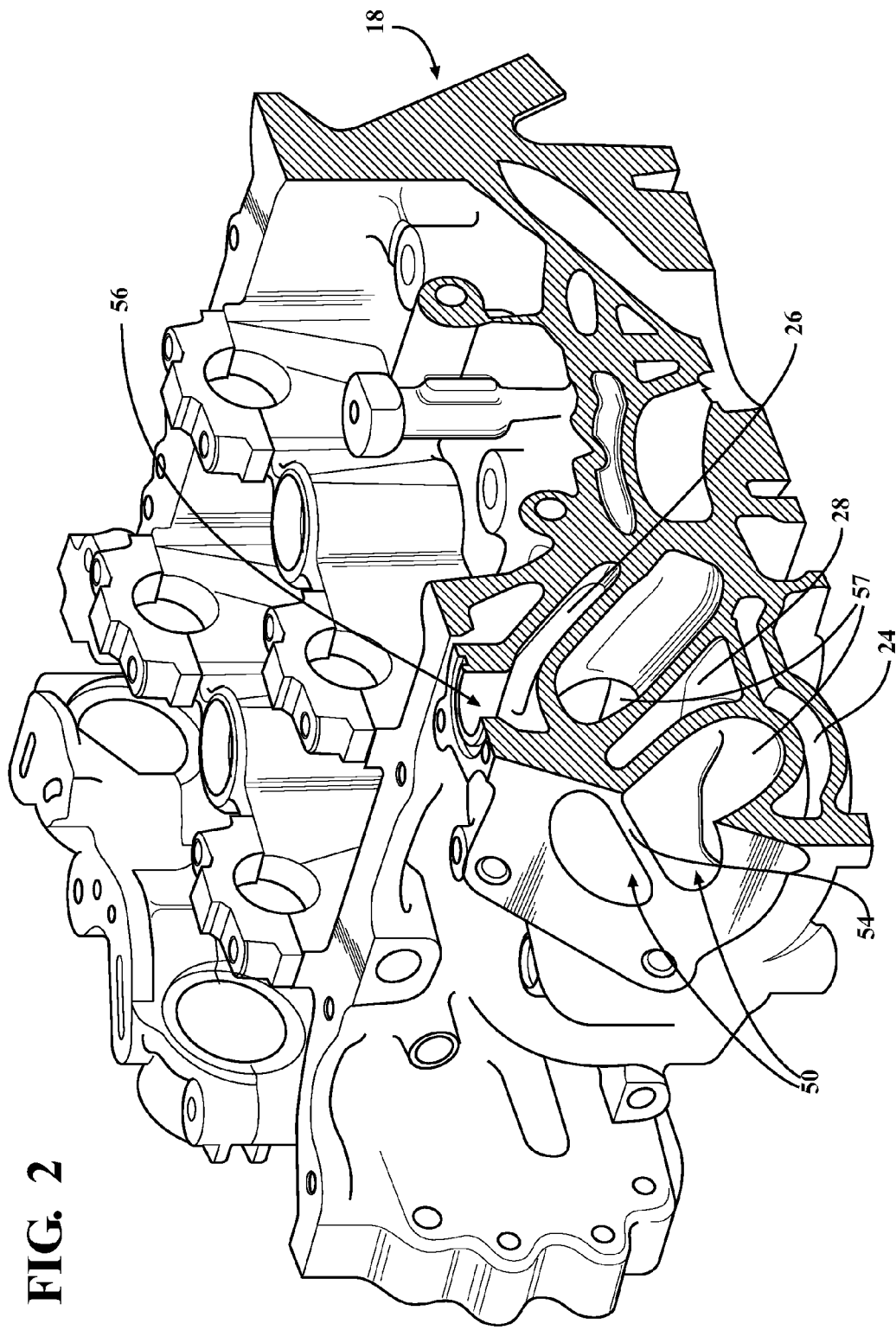
FIG. 2 is a perspective, cross-sectional, schematic view of a cylinder head of the engine having an integrated exhaust manifold, wherein the integrated exhaust manifold has an exhaust gas septum, which defines a plurality of exhaust ports, and an IEM coolant outlet, which is cast into the integrated exhaust manifold.
Figure 3:
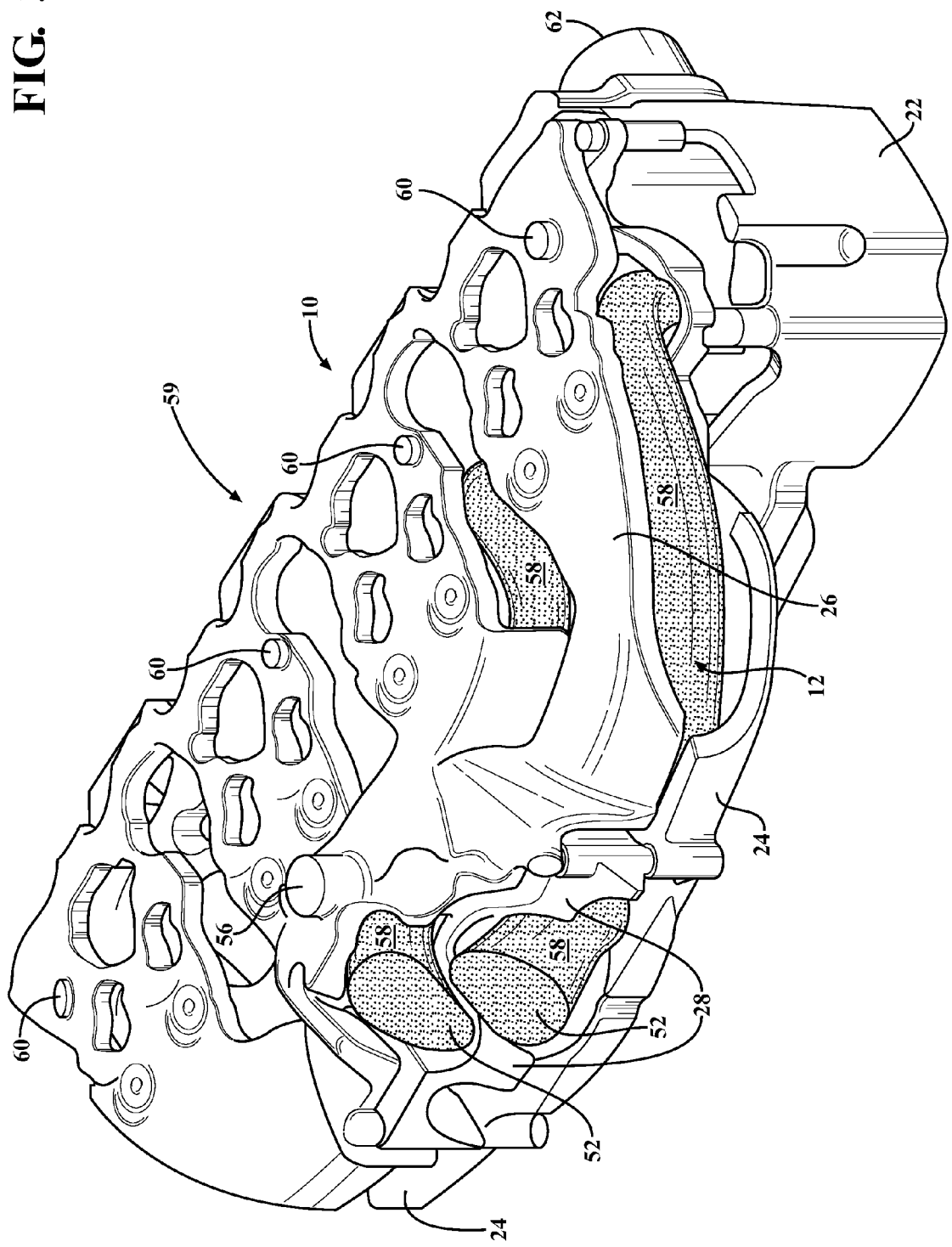
FIG. 3 is a perspective, schematic view of an engine water jacket associated with the engine thermal management system, the engine water jacket including an engine block cooling jacket, a lower head cooling jacket, a middle cooling jacket, and an upper head cooling jacket.

Referring to FIGS. 1-3, the engine thermal management system 10 may further include an engine water jacket 59. The engine water jacket 59 is configured to receive coolant from the coolant pump 21 and further configured to expel coolant from the IEM coolant outlet 56. The coolant flowing through the engine water jacket 59 and expelled from the IEM coolant outlet 56 is in heat exchange relation with the cylinder head 18 of the engine 14. The cylinder head 18 of the engine 14 is in heat exchange relation with the heated exhaust gas 58 flowing through the plurality of exhaust gas runners 57 and expelled from the exhaust gas ports 50. Thus, the engine water jacket 59 is effectively in heat exchange relation with the heated exhaust gas 58 via the engine cylinder head 18. The coolant flowing through the engine water jacket 59 absorbs heat from the heated exhaust gas 58, by extracting heat from the metallic material, which composes the cylinder head 18, resulting in a heated coolant to be expelled from the IEM coolant outlet 56. The heated coolant expelled from the IEM coolant outlet 56 is selectively routed by the controller 30 to one of a heater core 34, an engine oil heat exchanger 36, a transmission heat exchanger 38, and a radiator 32 (shown in FIGS. 4-6).

The engine water jacket 59 may include an engine block cooling jacket 22, a lower head cooling jacket 24, and an upper head cooling jacket 26. The engine water jacket 59 may also optionally include a middle cooling jacket 28.

Figure 4:
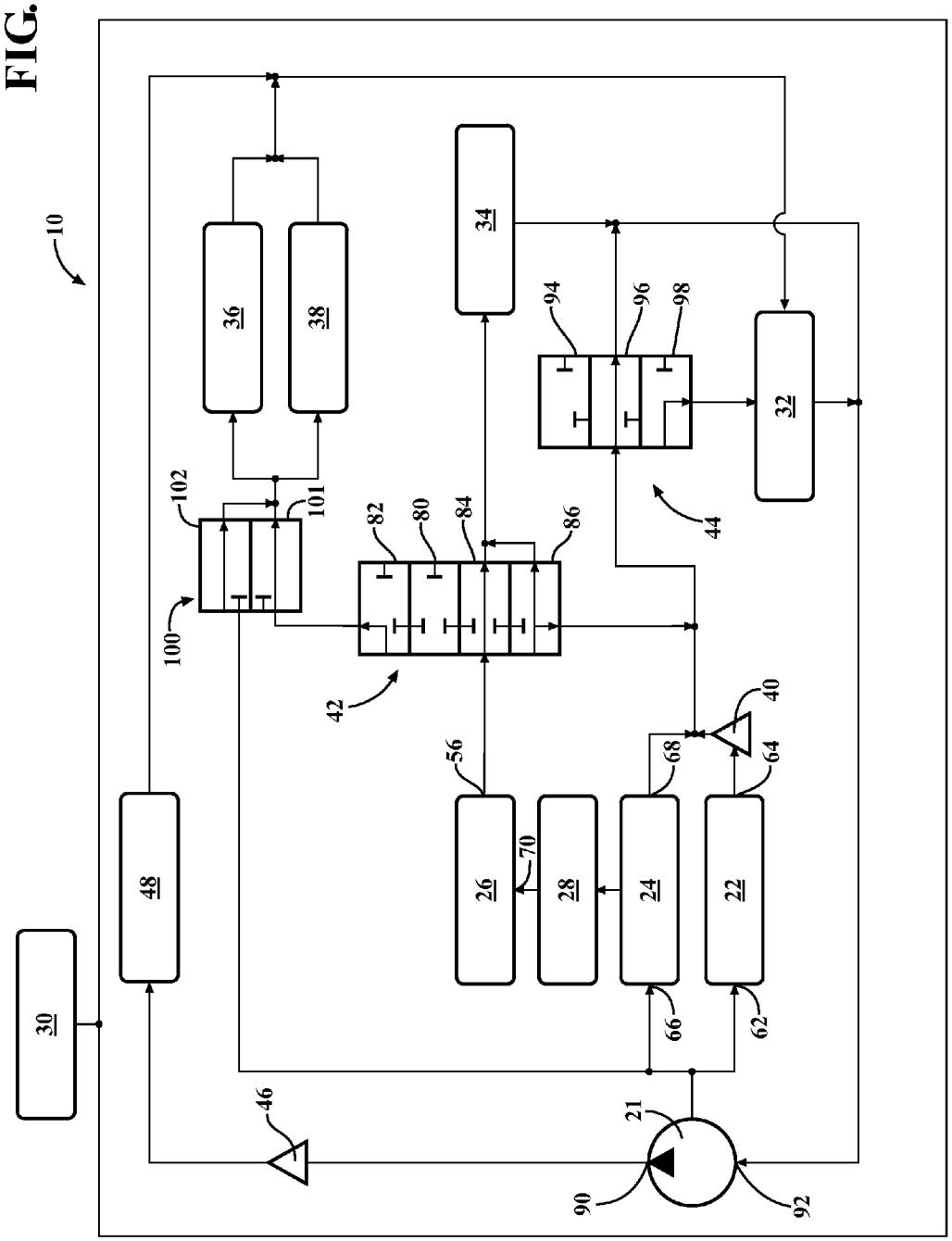
FIG. 4 is a schematic circuit diagram of a first example embodiment of the engine thermal management system.
Figure 5:
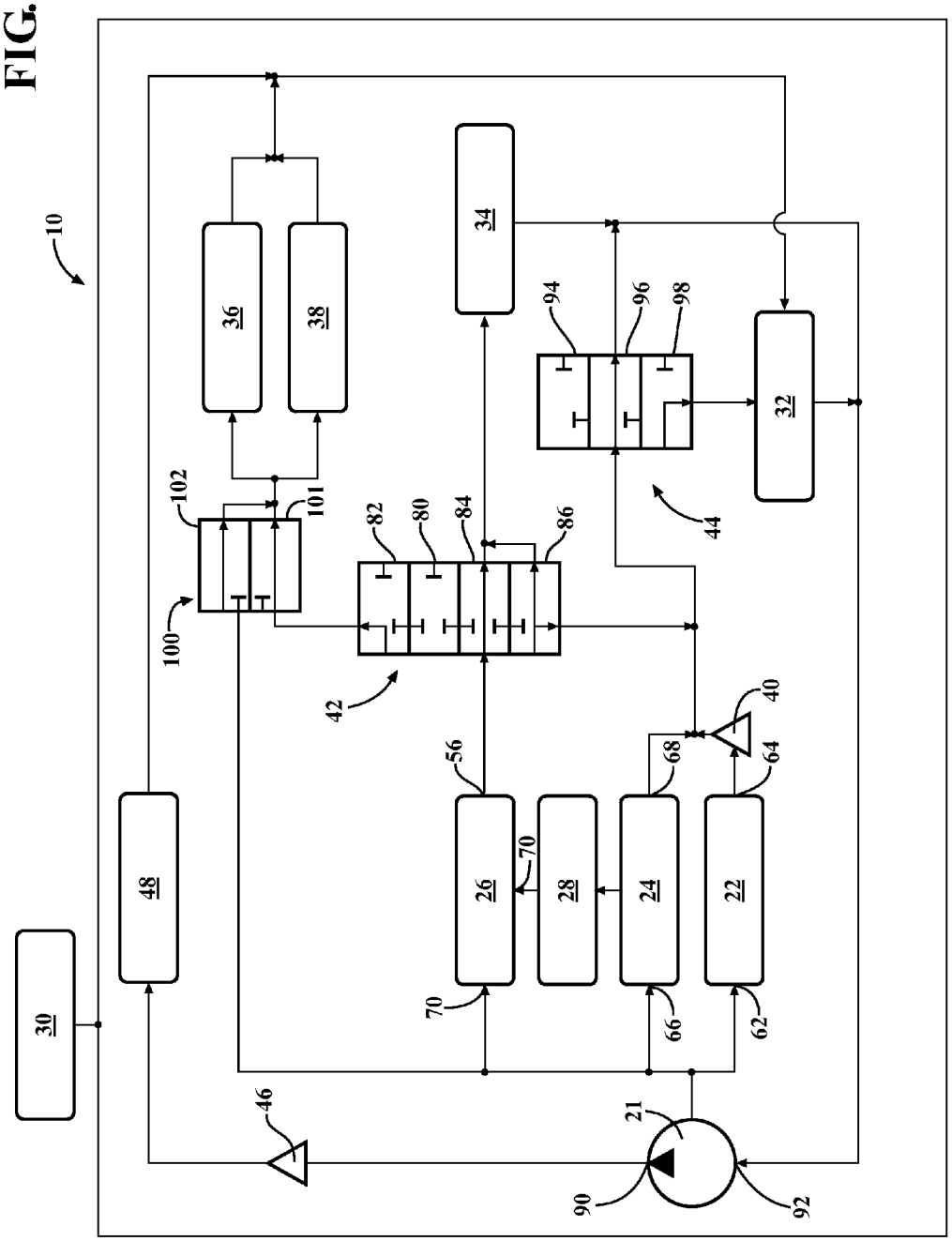
FIG. 5 is a schematic circuit diagram of a second example embodiment of the engine thermal management system.
Figure 6:
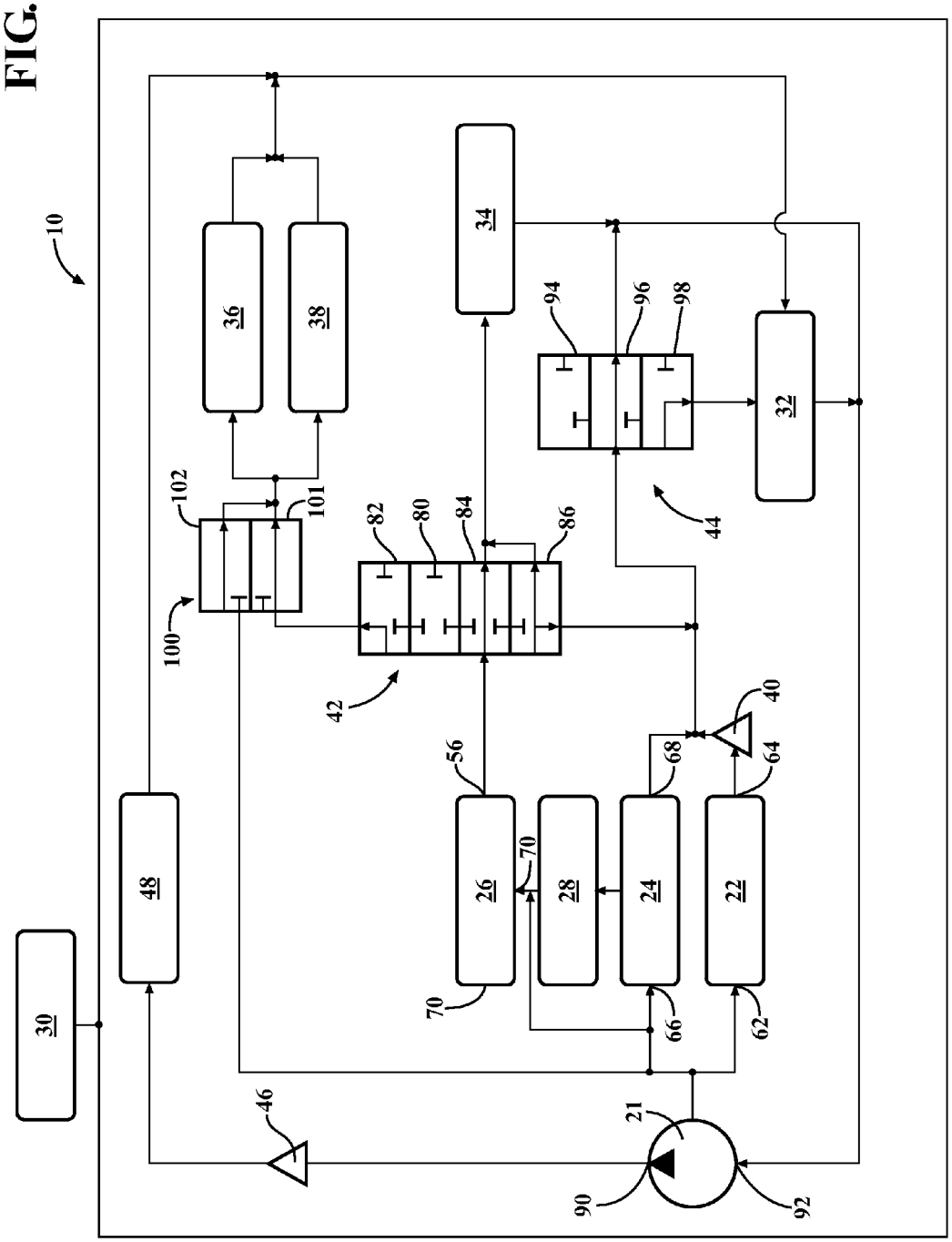
FIG. 6 is a schematic circuit diagram of a third example embodiment of the engine thermal management system.

The engine block cooling jacket 22 may include an engine block cooling jacket inlet 62, engine block coolant passages (shown in FIG. 2), and an engine block cooling jacket outlet 64 (shown in FIGS. 4-6).

The lower head cooling jacket 24 may include a lower head cooling jacket inlet 66 (shown in FIGS. 4-6), lower head coolant passages (shown in FIG. 2), and a plurality of transfer ports 60, which transfer coolant form the lower head cooling jacket 24 to the upper head cooling jacket 26. The lower head cooling jacket 24 may also include at least one lower head cooling jacket outlet 68 (shown in FIGS. 4-6). The lower head cooling jacket 24 is configured to expel coolant to the upper head cooling jacket 26 directly via the transfer ports 60, or may expel coolant to the upper head cooling jacket 26 via a middle cooling jacket 28. The lower head cooling jacket 24 is in heat exchange relation with the heated exhaust gas 58 flowing through the plurality of exhaust gas runners 57 of the exhaust gas system 12, via the engine cylinder head 18.

The middle cooling jacket 28, when present, may be configured to facilitate the transfer of coolant from the lower head cooing jacket 24 to the upper head cooling jacket 26 by receiving coolant from the lower head cooling jacket 24 and expelling coolant to the upper head cooling jacket 26. The middle cooling jacket 28 is in heat exchange relation with the exhaust gas septum 54, utilizing the coolant flowing through the middle cooling jacket 28 to absorb heat from the exhaust gas septum 54 and effectively cool the exhaust gas septum 54 component, which can be damaged under high engine load operation if the temperature thereof is not controlled.

The upper head cooling jacket 26 may include at least one upper head cooling jacket inlet 70, the IEM coolant outlet 56, and upper head jacket coolant passages (shown in FIG. 2). The coolant flowing through the upper head jacket 26 is in heat exchange relation with the heated exhaust gas 58 flowing through the plurality of exhaust gas runners 57 of the exhaust gas system 12, via the engine cylinder head 18.

The heated coolant flowing through the upper head cooling jacket 26 is expelled from the IEM coolant outlet 56 and selectively routed by a controller 30 (shown in FIGS. 4-6) to one of a heater core 34, an engine oil heat exchanger 36, a transmission heat exchanger 38, and a radiator 32 described herein below and shown in FIGS. 4-6.

The lower head cooling jacket 24, the middle cooling jacket 28, and the upper head cooling jacket 26 may be sized to enable the engine 14 to maintain the stoichiometric air to fuel equivalence ratio, $\lambda$, within the cylinders, wherein $\lambda=1$, i.e., the ideal ratio for combustion. $\lambda=1$ operation is often difficult to achieve at high-engine loads, due to high exhaust gas temperatures that result, which can damage components like the exhaust gas septum 54. Thus, most engines, under high load conditions, purposefully enrich the air to fuel mixture to lower the exhaust gas temperature, thereby operating at an air to fuel equivalence ratio, wherein $\lambda<1$. Operating with a rich fuel to air mixture wherein the air to fuel equivalence ratio is $\lambda<1$, while effective to reduce the temperature of the heated exhaust gas 58, consequently utilizes excess fuel to achieve the same power level that could be achieved via operation at an air to fuel equivalence ratio of $\lambda=1$, thereby decreasing the fuel economy of the vehicle.

In the present disclosure, the engine water jacket 59 is configured to extract heat from the cylinder head 18 and the exhaust gas septum 54 and deliver heat via the heated coolant to other portions of the system, namely the heater core 34, the transmission heat exchanger 38, and the engine oil heat exchanger 36. The engine thermal management system 10 of the present disclosure accomplishes the aims of an add-on Exhaust Gas Heat Recovery system (EGHR) without the added costs and required packaging space of an EGHR, which routes the exhaust gas through an additional heat exchanger to extract heat therefrom.

The engine water jacket 59 of the present disclosure is sized to substantially surround the exhaust runners 57 and the exhaust gas septum 54. The sizing and configuration of the engine water jacket 59 allows the lower head cooling jacket 24, the middle cooling jacket 28, and the upper head cooling jacket 26 (as shown in FIG. 3) to extract enough heat from the engine components to allow the engine 14 to operate at an air to fuel equivalence ratio of λ=1 throughout the entire intended engine load matrix, without damaging the respective components, e.g., the cylinder head 18, the exhaust gas septum 54, or turbine wheel in turbo-charged engines. Effectively operating the engine 14 at an air to fuel equivalence ratio of λ=1 throughout the entire intended engine load matrix, allows for the improvement of vehicle fuel economy.

For example, the middle cooling jacket 28 sufficiently surrounds the exhaust gas septum 54 providing coolant therearound to moderate the temperature thereof. Components such as the exhaust gas septum 54 may limit the ability for the engine 14 to operate at an air to fuel equivalence ratio of λ=1, because such components can be damaged under high engine load operation due to increased exhaust gas temperatures. The middle water jacket 28 of the present disclosure effectively cools the exhaust gas septum 54 component to prevent potential damage incurred by the respective component due to its heat exchange relationship with the heated exhaust gas 58 of increased temperature, which is produced during high engine loads when an air to fuel equivalence ratio of λ=1 is maintained.

Referring to the controller 30 generally shown in FIGS. 4-6, the controller 30 includes a processor and tangible, non-transitory memory on which is recorded instructions. Executing the recorded instructions causes the processor to effectuate the present method 200, described herein below with respect to FIG. 7. The controller 30 may be a stand-alone unit, or be part of an electronic controller that controls the operation of the engine thermal management system 10. The controller 30 may be embodied as a server/host machine or distributed system, e.g., a digital computer or microcomputer, acting as a vehicle control module, and/or as a proportional-integral-derivative (PID) controller device having a processor, and tangible, non-transitory memory such as read-only memory (ROM) or flash memory. The controller 30 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry.

In general, computing systems and/or devices, such as the controller 30, may employ any of a number of computer operating systems and generally include computer-executable instructions, where the instructions may be executable by one or more computing devices such as those listed above. Computer-executable instructions may be compiled or interpreted from computer programs created using a variety of well-known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

Therefore, the controller 30 can include all software, hardware, memory, algorithms, connections, sensors, etc., necessary to control and effectuate the operation of the engine thermal management system 10. As such, the controller 30 may be configured to monitor and control the engine thermal management process at a variety of engine stages, such as cold start, engine warm-up, and normal vehicular operation or engine cooling. The controller 30 may communicate with a coolant pump 21 to control the speed at which the pump 21 operates. The controller 30 may further be configured to control the operation of the plurality of flow control valves 40, 42, 44, 100 as well as communicate with various other subsystems and sensors on the engine 14.

Referring to FIGS. 4-6, the engine thermal management system 10 may further include a coolant pump 21, a radiator 32, a heater core 34, an engine oil heat exchanger 36, a transmission heat exchanger 38, a plurality of flow control valves 40, 42, 44, 100, an on/off valve 46, and a turbocharger cooler 48.

The coolant pump 21 may include a coolant pump outlet 90 and a coolant pump inlet 92. The coolant pump 21 may be configured to circulate the coolant through the engine thermal management system 10, from the coolant pump outlet 90 to the engine water jacket 59 via at least one of the engine block cooling jacket inlet 62, the lower head cooling jacket inlet 66, and the upper head cooling jacket inlet 70. The coolant pump 21 may be one of an electrical, mechanical, and hybrid electrical-mechanical coolant pump 21. The mechanical pump variation may be powered by the engine crankshaft (not shown) and the electrical or hybrid pump variation may be controlled by the controller 30, and may provide coolant independent of engine speed and allow for stopping of coolant flow, for maximum engine 14 and/or coolant warm-up.

The engine thermal system 10 may include a plurality of flow control valves 40, 42, 44, 100 which may be configured to occupy determinant positions in order to selectively distribute flow of the coolant expelled from the coolant pump 21, the IEM coolant outlet 56, the at least one lower head cooling jacket outlet 68, and the at least one engine block cooling jacket outlet 64, to at least one of the heater core 34, the engine oil heat exchanger 36, the transmission heat exchanger 38, and the radiator 32. The plurality of flow control valves 40, 42, 44, 100 may be configured to receive coolant from at least one of the coolant pump 21, the engine block cooling jacket 22, the lower head cooling jacket 24, and the upper head cooling jacket 26. The plurality of control valves 40, 42, 44, 100 are controlled and actuated to the respective predetermined positions by the controller 30.

The plurality of flow control valves includes at least a first flow control valve 40, a second flow control valve 42, a third flow control valve 44, and a mode selection valve 100. The first flow control valve 40 is configured to receive coolant from the engine block cooling jacket 22 via the engine block cooling jacket outlet 64. The first flow control valve 40 is further configured to occupy one of an open position and a closed position. The first flow control valve 40 may be any conventional, multi-port, two-way valve.

The second flow control valve 42 is configured to receive coolant from the upper head cooling jacket 26 via the IEM coolant outlet 56. Second flow control valve 42 is actuated by the controller 30 to occupy one of a first position 80, a second position 82, a third position 84, and a fourth position 86. The IEM coolant outlet 56, dependent upon the occupied position of the second flow control valve 42, expels coolant to one of the heater core 34, the transmission heat exchanger 38 and the engine oil heat exchanger 36 via the mode selection valve 100, and the third flow control valve 44 via the second flow control valve 42. The second flow control valve 42 is closed in the first position 80, expels coolant to the engine oil heat exchanger 36 and the transmission heat exchanger via the mode selection valve 100 in the second position 82, expels coolant to the heater core 34 in the third position 84, and expels coolant to the heater core 34 and the radiator 32 via the third flow control valve 44 in the fourth position 86.

The third flow control valve 44 is configured to receive coolant from each of the lower head cooling jacket 24, the first flow control valve 40, and the second flow control valve 42. The third flow control valve 44 is actuated by the controller 30 to occupy one of a first position 94, a second position 96, and a third position 98. The third flow control valve 44 is closed in the first position 94, expels coolant to the coolant pump 21 in the second position 96, and expels coolant to the radiator 32 in the third position 98.

The mode selection valve 100 is configured to receive coolant from one of the coolant pump 21 and the second flow control valve 42. The mode selection valve 100 is further configured to occupy one of a first position 101 and a second position 102. When the engine oil and transmission require warming, the mode selection valve 100 occupies the first position 101 and receives warm coolant from the second flow control valve 42 and expels warm coolant to each of the engine oil heat exchanger 36 and the transmission heat exchanger 38 to facilitate the warming of each of the transmission and the engine oil.

When the engine oil and transmission require cooling, the mode selection valve 100 occupies the second position 102 and receives cold coolant from the coolant pump 21 and expels cold coolant to each of the engine oil heat exchanger 36 and the transmission heat exchanger 38 to facilitate the cooling of each of the transmission and the engine oil.

The engine thermal management system 10 may also include at least one on/off valve 46. The at least one on/off valve is configured to occupy one of an open position and a closed position, such that in the open position the at least one on/off valve 46 receives cold coolant from the coolant pump 21 and expels cold coolant to a turbocharger cooler 48. The turbocharger cooler 48 is configured to receive coolant from the at least one on/off valve 46, when the at least one on/off valve 46 occupies the open position, i.e., during normal vehicle operation. The turbocharger cooler 48 is configured to facilitate cooling of a turbocharger (not shown) of the engine 14. The turbocharger cooler 48 is further configured to expel coolant to the radiator 32.

FIGS. 4-6 depict three example embodiments of the engine thermal management system 10. In the first embodiment, shown in FIG. 4, the coolant pump 21 directly feeds the lower head cooling jacket 24 and the engine block cooling jacket 22. Coolant may be directed along a flow path to each of the lower head cooling jacket inlet 66 and engine block cooling jacket inlet 62, respectively. In this example embodiment, the lower head cooling jacket inlet 66 and the engine block cooling jacket inlet 62 may be sized so as to allow the desirable amount of coolant to enter each of the respective lower head cooling jacket inlet 66 and the engine block cooling jacket inlet 62. The coolant directed to the engine block cooling jacket 22 enters the engine block cooling jacket inlet 62 and may flow through the plurality of engine block cooling passages. The coolant may be expelled from the engine block cooling jacket outlet 64 to the first flow control valve 40, located on the outlet side of the engine block cooling jacket 22.

The first flow control valve 40 is shown, in FIG. 4, on the outlet side of the engine block cooling jacket 22 and may be configured to receive coolant from the engine block cooling jacket outlet 64. The first flow control valve 40 may be further configured to adjust flow in the engine block cooling jacket 22 and control the engine temperature independent of the lower head cooling jacket 24 and the upper head cooling jacket 22, which can be critical for fuel spray impinging on the liner wall of the engine cylinders within the engine block 16 (shown in FIG. 1). Dependent upon the actuated position of the first flow control valve 40, the first flow control valve 40 may be configured to selectively distribute and partially or entirely restrict flow of the coolant from the engine block cooling jacket 22 to the flow path of coolant expelled from the lower head cooling jacket outlet 24. The coolant expelled from the first flow control valve 40, when the first flow control valve 40 occupies the open position, may be directed to the third flow control valve 44.

The coolant directed to the lower head cooling jacket 24 may enter the lower head cooling jacket 24 at the lower head coolant inlet 66 and may flow through the plurality of lower head cooling passages. The coolant may be expelled from the lower head cooling jacket outlet 68 to the third flow control valve 44. The third flow control valve 44 may be configured to receive coolant and selectively distribute and partially or entirely restrict the flow of coolant to the radiator 32 and the return path to the coolant pump 21.

The coolant directed to the lower head cooling jacket 24 may also be distributed, as shown in FIG. 4 to the upper head cooling jacket 26. If the system 10 includes a middle cooling jacket 28, coolant is transferred through a plurality of transfer ports 60 (FIG. 3) from the lower head cooling jacket 24 to the middle cooling jacket 28 and to the upper head cooling jacket 26, via the at least one upper head cooling jacket inlet 70. If the system 10 does not include a middle cooling jacket 28, coolant is transferred directly from the lower head cooling jacket 24 to the upper head cooling jacket 26 via the plurality of transfer ports 60 and the at least one upper head cooling jacket inlet 70. The coolant may flow from the upper head cooling jacket inlet 70 through the plurality of upper head cooling passages to the IEM coolant outlet 56.

The heated coolant expelled from the IEM coolant outlet 56 may be directed from the IEM coolant outlet 56 to the second flow control valve 42, which may be configured to selectively distribute and partially or entirely restrict coolant flow to one of the heater core 34, the third flow control valve 44, and an engine oil heat exchanger 36 and a transmission heat exchanger 38, via the mode selection valve 100.

When the second flow control valve 42 occupies the first position 80, the second flow control valve is closed and no coolant passes therethrough. When the second flow control valve 42 occupies the second position 82, the heated coolant expelled from the IEM coolant outlet 56 is directed to each of the engine oil heat exchanger 36 and the transmission heat exchanger 38, via the mode selection valve 100 occupying the first position 101, to warm the engine oil and the transmission, respectively. After passing through each of the engine oil heat exchanger 36 and the transmission heat exchanger 38 coolant is directed through the radiator 32 and back to the coolant pump 21.

When the second flow control valve 42 occupies the third position 84, the heated coolant expelled from the IEM coolant outlet 56 is directed to the heater core 34, to aid in heating a passenger compartment of the vehicle. A minimum amount of coolant flow is constant to the heater core 34 in order to effectively raise the dew point. The coolant directed to the heater core 34 may pass through the heater core 34 and may be routed back to the coolant pump 21.

When the second flow control valve 42 occupies the fourth position 86, the heated coolant expelled from the IEM coolant outlet 56 is directed to the third flow control valve 44 and the heater core 34, such that only a leakage path of the second flow control valve 42 is open to the heater core 34, allowing only the minimum amount of coolant flow necessary to raise the dew point to be selectively distributed to the heater core 34. The third flow control valve 44 may receive the coolant and selectively distribute the coolant to one of the radiator 32 and the coolant pump 21, dependent upon the actuated position of the third flow control valve 44, i.e., the first position 94, the second position 96, or the third position 98.

When the third flow control valve 44 occupies the first position 94, the third flow control valve 44 is fully closed. When the third flow control valve 44 occupies the second position 96, the third flow control valve 44 expels coolant back to the coolant pump 21. When the third flow control valve occupies the third position 98, the third flow control valve 44 expels coolant to the radiator 32, which passes therethrough and is directed back the coolant pump 21.

FIG. 5 depicts a second example embodiment of the thermal management system 10. In the second example embodiment, shown in FIG. 5, the coolant pump 21 may directly feed the lower head cooling jacket 24, the engine block cooling jacket 22, and the upper head cooling jacket 26 as independent circuits. Coolant may be directed along a flow path to each of the engine block inlet 62, the lower head cooling jacket inlet 66, and the at least one upper head jacket inlet 70, respectively.

The coolant directed to the engine block cooling jacket 22 enters the engine block cooling jacket inlet 62 and may flow through the plurality of engine block cooling passages. The coolant may be expelled from the engine block cooling jacket outlet 64 to the first flow control valve 40, located on the outlet side of the engine block cooling jacket 22. Dependent upon the actuated position of the first flow control valve 40, i.e., one of the open position and the closed position, the first flow control valve 40 may be configured to selectively distribute and partially or entirely restrict flow of the coolant from the engine block cooling jacket 22 to the flow path of coolant expelled from the lower head cooling jacket outlet 24. When the first flow control valve 40 occupies the closed position no coolant passes therethrough. When the first flow control valve 40 occupies the open position, the coolant is expelled from the first flow control valve 40, and directed to the third flow control valve 44.

The coolant directed to the lower head cooling jacket 24 may enter the lower head cooling jacket 24 at the lower head coolant inlet 66 and may flow through the plurality of lower head cooling passages. The coolant may be expelled from the lower head cooling jacket outlet 68 to the third flow control valve 44. The third flow control valve 44 may be configured to receive coolant and selectively distribute and partially or entirely restrict the flow of coolant to the radiator 32 and the return path to the coolant pump 21.

The coolant directed to the lower head cooling jacket 24 may also be distributed, as shown in FIG. 5 to the upper head cooling jacket 26. If the system 10 includes a middle cooling jacket 28, coolant is transferred through a plurality of transfer ports 60 (FIG. 3) from the lower head cooling jacket 24 to the middle cooling jacket 28 and to the upper head cooling jacket 26, via the at least one upper head cooling jacket inlet 70. If the system 10 does not include a middle cooling jacket 28, coolant is transferred directly from the lower head cooling jacket 24 to the upper head cooling jacket 26 via the plurality of transfer ports 60 and the at least one upper head cooling jacket inlet 70. The coolant may flow from the upper head jacket inlet 70 through the plurality of upper head cooling passages to the IEM coolant outlet 56.

As shown in FIG. 5, in addition to coolant expelled to the upper head cooling jacket 26 from one of the lower head cooling jacket 24 and the middle cooling jacket 28, the upper head cooling jacket 26 may receive coolant flow directly from coolant pump 21 at the at least one upper head cooling jacket inlet 70, as an independent circuit. The coolant may flow from the upper head cooling jacket inlet 70 through the plurality of upper head jacket coolant passages to the IEM coolant outlet 56.

The heated coolant expelled from the IEM coolant outlet 56 may be directed from the IEM coolant outlet 56 to a second flow control valve 42, which may be configured to selectively distribute and partially or entirely restrict coolant flow to one of the heater core 34, the third flow control valve 44, and an engine oil heat exchanger 36 and a transmission heat exchanger 38, as described above with respect to FIG. 4.

When the second flow control valve 42 occupies the first position 80, the second flow control valve is closed and no coolant passes therethrough. When the second flow control valve 42 occupies the second position 82, the heated coolant expelled from the IEM coolant outlet 56 is directed to each of the engine oil heat exchanger 36 and the transmission heat exchanger 38, via the mode selection valve 100 in the first position 101, to warm the engine oil and the transmission, respectively. After passing through each of the engine oil heat exchanger 36 and the transmission heat exchanger 38 coolant is directed through the radiator 32 and back to the coolant pump 21.

When the second flow control valve 42 occupies the third position 84, the heated coolant expelled from the IEM coolant outlet 56 is directed to the heater core 34, in order to aid in heating a passenger compartment of the vehicle. A minimum amount of coolant flow is constant to the heater core 34 in order to effectively raise the dew point. The coolant directed to the heater core 34 may pass through the heater core 34 and may be routed back to the coolant pump 21.

When the second flow control valve 42 occupies the fourth position 86, the heated coolant expelled from the IEM coolant outlet 56 is directed to the third flow control valve 44 and the heater core 34, such that only a leakage path of the second flow control valve 42 is open to the heater core 34, allowing only the minimum amount of coolant flow necessary to raise the dew point to be selectively distributed to the heater core 34. The third flow control valve 44 may receive the coolant and selectively distribute the coolant to one of the radiator 32 and the coolant pump 21, dependent upon the actuated position of the third flow control valve 44, i.e., the first position 94, the second position 96, or the third position 98.

When the third flow control valve 44 occupies the first position 94, the third flow control valve 44 is fully closed. When the third flow control valve 44 occupies the second position 96, the third flow control valve 44 expels coolant back to the coolant pump 21. When the third flow control valve occupies the third position 98, the third flow control valve 44 expels coolant to the radiator 32, which passes therethrough and is directed back the coolant pump 21.

FIG. 6 depicts a third example embodiment of the thermal management system 10. In the third embodiment, shown in FIG. 6, the coolant pump 21 may directly feed the lower head cooling jacket 24 and the engine block cooling jacket 22. The coolant pump 21 may also feed the upper head cooling jacket 26 by feeding the additional coolant into the flow path of coolant expelled from the lower head cooling jacket 24 to the upper head cooling jacket 26.

The coolant directed to the engine block cooling jacket 22 enters the engine block cooling jacket inlet 62 and may flow through the plurality of engine block cooling passages. The coolant may be expelled from the engine block cooling jacket outlet 64 to the first flow control valve 40, located on the outlet side of the engine block cooling jacket 22. Dependent upon the actuated position of the first flow control valve 40, i.e., one of the open position and the closed position, the first flow control valve 40 may be configured to selectively distribute and partially or entirely restrict flow of the coolant from the engine block cooling jacket 22 to the flow path of coolant expelled from the lower head cooling jacket outlet 24. When the first flow control valve 40 occupies the closed position no coolant passes therethrough. When the first flow control valve 40 occupies the open position, the coolant is expelled from the first flow control valve 40, and directed to the third flow control valve 44.

The coolant directed to the lower head cooling jacket 24 may enter the lower head cooling jacket 24 at the lower head coolant inlet 66 and may flow through the plurality of lower head cooling passages. The coolant may be expelled from the lower head cooling jacket outlet 68 to the third flow control valve 44. The third flow control valve 44 may be configured to receive coolant and selectively distribute and partially or entirely restrict the flow of coolant to the radiator 32 and the return path to the coolant pump 21.

The coolant directed to the lower head cooling jacket 24 may also be distributed, as shown in FIG. 6 to the upper head cooling jacket 26. If the system 10 includes a middle cooling jacket 28, coolant is transferred through a plurality of transfer ports 60 (FIG. 3) from the lower head cooling jacket 24 to the middle cooling jacket 28 and to the upper head cooling jacket 26, via the at least one upper head cooling jacket inlet 70. If the system 10 does not include a middle cooling jacket 28, coolant is transferred directly from the lower head cooling jacket 24 to the upper head cooling jacket 26 via the plurality of transfer ports 60 and the at least one upper head cooling jacket inlet 70. The coolant may flow from the upper head jacket inlet 70 through the plurality of upper head cooling passages to the IEM coolant outlet 56.

As shown in FIG. 6, in addition to coolant expelled to the upper head cooling jacket 26 from one of the lower head cooling jacket 24 and the middle cooling jacket 28, the upper head cooling jacket 26 may receive coolant through metering from the coolant pump 21, wherein the coolant flow is directed to the coolant flow path of the coolant expelled from the lower head cooling jacket 24 to the upper head cooling jacket 26, if no middle cooling jacket 28 is present, or from the middle cooling jacket 28 to the upper head cooling jacket 26.

The heated coolant expelled from the IEM coolant outlet 56 may be directed from the IEM coolant outlet 56 to a second flow control valve 42, which may be configured to selectively distribute and partially or entirely restrict coolant flow to one of the heater core 34, the third flow control valve 44, and an engine oil heat exchanger 36 and a transmission heat exchanger 38, via the mode selection valve 100 occupying the first position 101, as described above with respect to FIGS. 4 and 5.

When the second flow control valve 42 occupies the first position 80, the second flow control valve is closed and no coolant passes therethrough. When the second flow control valve 42 occupies the second position 82, the heated coolant expelled from the IEM coolant outlet 56 is directed to each of the engine oil heat exchanger 36 and the transmission heat exchanger 38, to warm the engine oil and the transmission, respectively. After passing through each of the engine oil heat exchanger 36 and the transmission heat exchanger 38 coolant is directed through the radiator 32 and back to the coolant pump 21.

When the second flow control valve 42 occupies the third position 84, the heated coolant expelled from the IEM coolant outlet 56 is directed to the heater core 34, in order to aid in heating a passenger compartment of the vehicle. A minimum amount of coolant flow is constant to the heater core 34 in order to effectively raise the dew point. The coolant directed to the heater core 34 may pass through the heater core 34 and may be routed back to the coolant pump 21.

When the second flow control valve 42 occupies the fourth position 86, the heated coolant expelled from the IEM coolant outlet 56 is directed to the third flow control valve 44 and the heater core 34, such that only a leakage path of the second flow control valve 42 is open to the heater core 34, allowing only the minimum amount of coolant flow necessary to raise the dew point to be selectively distributed to the heater core 34. The third flow control valve 44 may receive the coolant and selectively distribute the coolant to one of the radiator 32 and the coolant pump 21, dependent upon the actuated position of the third flow control valve 44, i.e., the first position 94, the second position 96, or the third position 98.

When the third flow control valve 44 occupies the first position 94, the third flow control valve 44 is fully closed. When the third flow control valve 44 occupies the second position 96, the third flow control valve 44 expels coolant back to the coolant pump 21. When the third flow control valve occupies the third position 98, the third flow control valve 44 expels coolant to the radiator 32, which passes therethrough and is directed back the coolant pump 21.

As shown in FIGS. 4-6, the engine thermal management system 10 may further include at least one on/off valve 46 and a turbocharger cooler 48. The coolant pump 21 may feed coolant directly to the on/off valve 46, in addition to directly feeding at least one of the engine block cooling jacket 22, the lower head cooling jacket 24, and the upper head cooling jacket 26. The at least one on/off valve 46 is actuated by the controller 30 to occupy one of an open position and a closed position. When the on/off valve is in the open position, coolant expelled from the coolant pump outlet 90 is directed to the turbocharger cooler 48 to aid in cooling a turbocharger (not shown). Once coolant passes through the turbocharger cooler 48, it is directed to the radiator 32 and then back to the coolant pump 21. When the on/off valve 46 occupies the closed position coolant expelled from the coolant pump outlet 90 is prohibited from accessing the turbocharger cooler 48. The on/off valve 46 may remain closed during cold-start and engine warm-up operating modes, and may open as the load on the engine 14 increases and cooling of the turbocharger via the turbocharger cooler 48 may become necessary.

Each of the variations shown in FIGS. 4-6, is suited to function in a variety of automotive operational modes, namely, engine cold-start; engine warm-up, e.g., cold-weather warm-up and warm-weather warm-up; and engine cooling, e.g., normal vehicle operation. The engine thermal strategy for each of the engine cold-start, engine warm-up, and engine cooling modes is detailed by the present method 200, in which recorded instructions are executed by the controller 30 causing the processor therein to effectuate the method detailed by FIG. 7.

Figure 7:
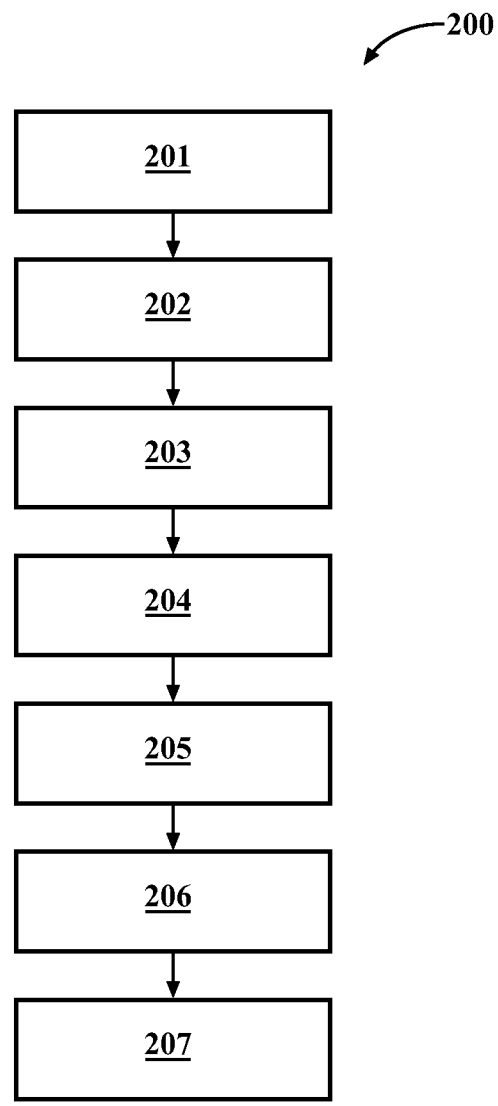
FIG. 7 is a flow diagram describing the steps of the present method of thermal management for an automotive engine.

Referring to FIG. 7, at step 201, the controller 30 actuates the plurality of control valves 40, 42, 44 to occupy a fully closed position until the engine reaches a predetermined temperature. This step defines the engine cold-start operating mode. During engine cold-start operating mode, in each of the three variations shown in FIGS. 4-6, each of the respective first, second, and third flow control valves 40, 42, 44 are fully closed, i.e., the first flow control valve 40 is actuated by the controller 30 to occupy the closed position, the second flow control valve 42 is actuated by the controller 30 to occupy the first position 80, and the third flow control valve 44 is actuated by the controller 30 to occupy the first position 94. Further, during engine cold-start the coolant pump 21 is initially turned off, rendering the coolant stagnant. Additionally, the on/off valve 46 may be fixed fully closed. The primary objective of the thermal management system 10, during engine cold-start, is to warm the engine and the coolant to a desired temperature for vehicle operation.

Steps 202-205 define the engine warm-up operating mode. Once the coolant has sufficiently warmed during the engine cold-start operating mode, the coolant pump 21 may be started, as depicted by step 202. At step 202, the controller 30 signals the coolant pump 21 to start and to circulate coolant through the thermal management system 10, after the engine 14 reaches a first predetermined temperature, which is achieved as a result of the engine cold-start mode defined by step 201.

At step 203, the controller 30 actuates the second flow control valve 42 to the second position 82. At step 203, the first flow control valve 40 remains in the closed position and the third flow control valve 44 remains in the first position 94, in order to maintain initial heat-up of the engine block 16. During engine warm-up the engine block cooling jacket inlet 62 and the lower head jacket inlet 66 may be fixed open. However, because the first flow control valve 40 is fully closed, the coolant in the engine block jacket 22 remains stagnant to facilitate engine warm-up. The third flow control valve 44 is also fully closed, thereby routing all flow from the lower head cooling jacket 24 to the upper head cooling jacket 26. The second flow control valve 42 may be configured to receive all flow from the upper head cooling jacket 26 expelled from the IEM coolant outlet 56.

At step 204, the controller 30 selectively directs the heated coolant expelled from the IEM coolant outlet 56 to the second flow control valve 42, such that the second flow control valve 42, while occupying the second position 82, directs coolant to the engine oil heat exchanger 36 and the transmission heat exchanger 38, respectively, via the at least one mode selection valve 100 occupying the first position 101, to facilitate warming of the engine oil and the transmission respectively. Coolant circulating throughout the engine thermal management system 10 flows through the upper head cooling jacket 26 and is thus placed in heat exchange relation with the exhaust gas runners 57. The coolant then absorbs heat from the heated exhaust gas 58 flowing through the exhaust gas runners 57 by extracting heat from the cylinder head 16 and carries the extracted heat to the engine oil heat exchanger 36 and the transmission heat exchanger 38 via the IEM coolant outlet 56. The coolant may be used to heat the engine oil and heat the transmission to a suitable operating temperature, when routed from the second flow control valve 42 actuated to the second position 82 to the mode selection valve 100 occupying the first position 101 to thereby feed the engine oil heat exchanger 36 and the transmission heat exchanger 38. Pre-heating the engine oil and transmission can improve fuel economy and reduce friction.

At step 205, the controller 30 actuates the second flow control valve to occupy the third position 84, thereby directing coolant to the heater core 34 to heat a passenger compartment, after the engine oil reaches a predetermined temperature and the transmission reaches a predetermined temperature. When the second flow control valve 42 occupies the third position 84, coolant is fed to the heater core 34 to facilitate warming of the passenger compartment to meet heating demand. During cold weather warm-up, the coolant pump 21 speed may be controlled by the controller 30 in order to continue warming the engine 14, while also feeding the heater core 34 to warm the passenger compartment.

At step 206, the controller 30 actuates the first flow control valve 40 to occupy the open position, the second flow control valve to occupy the fourth position 86, thereby directing all coolant from the second flow control vale 42 to the third flow control valve 44. The second flow control valve 42 is actuated from the third position 84 to the fourth position 86 when the heating demand from the passenger compartment has been met, i.e. the passenger compartment reaches a predetermined temperature.

At step 207, the controller 30 selectively distributes coolant from the third flow control valve 44 to one of the coolant pump 21 and the radiator 32. In selectively directing and distributing the coolant at step 207, the controller 30 actuates the third flow control valve 44 to occupy one of the second position 96 and the third position 98.

The controller 30 actuates the third flow control valve 44 to the second position 96, when the passenger compartment heating demand is met before the engine 14 reaches a second predetermined temperature, e.g., the engine thermal management system 10 remains in engine warm-up mode. When occupying the second position 96, the third flow control valve 44 directs coolant back to the coolant pump 21 in order to continue to facilitate warming of the engine 14.

The controller 30 actuates the third flow control valve 44 to the third position 98, when the passenger compartment heating demand is met after the engine 14 reaches a second predetermined temperature, e.g., the engine thermal management system 10 transitions to engine cooling mode. When occupying the third position 98, the third flow control valve 44 directs all coolant passing therethrough to the radiator 32 to facilitate cooling of the engine 14.

When the engine thermal management system 10, operates in engine cooling mode, the objective of the engine thermal management system 10 is to route as much coolant flow through the radiator 32 as possible. In all variations shown in FIGS. 4-6, during engine cooling mode, the at least one on/off valve 46 is actuated to the open position allowing coolant from the coolant pump 21 to pass therethrough and on to the turbocharger cooler 48, to facilitate the cooling of a turbocharger. In all variations shown in FIGS. 4-6, during engine cooling mode, the mode selection valve 100 is actuated to the second position 102 allowing coolant from the coolant pump 21 to pass therethrough and on to the engine oil heat exchanger 36 and the transmission heat exchanger 38, to facilitate the cooling of the engine oil and transmission respectively.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An engine thermal management system for a vehicle having an exhaust gas system, a transmission, and an engine having a cylinder head and an integrated exhaust manifold (IEM), the engine thermal management system comprising:
  a coolant pump;
  an engine water jacket configured to receive coolant from the coolant pump and further configured to expel coolant from an IEM coolant outlet, wherein the IEM coolant outlet is cast into the integrated exhaust manifold, wherein the engine water jacket includes:
    an engine block cooling jacket and a lower head cooling jacket, each configured to receive coolant from the coolant pump; and
    an upper head cooling jacket configured to receive coolant from at least one of the coolant pump and the lower head cooling jacket and further configured to expel coolant from the IEM coolant outlet;
a plurality of flow control valves configured to receive coolant from at least one of the coolant pump and the engine water jacket;
a heater core configured to receive coolant from at least one of the plurality of flow control valves;
a transmission heat exchanger configured to receive coolant from at least one of the coolant pump and the engine water jacket via at least one of the plurality of flow control valves;
an engine oil heat exchanger configured to receive coolant from at least one of the coolant pump and the engine water jacket via at least one of the plurality of flow control valves;
a radiator configured to receive coolant from at least one of the plurality of flow control valves, the transmission heat exchanger, and the engine oil heat exchanger;
a controller configured to control at least the coolant pump and the plurality of flow control valves, the controller having a processor and tangible, non-transitory memory on which is recorded instructions, wherein executing the recorded instructions causes the processor to direct flow of coolant through the engine thermal management system;
wherein the plurality of flow control valves includes:
a first flow control valve configured to occupy one of an open position and a closed position, the first flow control valve further configured to receive coolant from the engine block cooling jacket;
a second flow control valve configured to occupy one of a first position, a second position, a third position, and a fourth position, such that the second flow control valve receives coolant from the upper head cooling jacket and expels warm coolant to each of the transmission heat exchanger and the engine oil heat exchanger when occupying the second position, expels coolant to the heater core when occupying the third position, and expels coolant to a third flow control valve when occupying the fourth position;
a mode selection valve configured to occupy one of a first position and a second position, such that when the mode selection valve occupies the first position the mode selection valve receives coolant from the second flow control valve and expels coolant to each of the transmission heat exchanger and the engine oil heat exchanger, and such that when the mode selection valve occupies the second position the mode selection valve receives coolant from the coolant pump and expels coolant to each of the transmission heat exchanger and the engine oil heat exchanger; and
the third flow control valve configured to occupy one of a first position, a second position, and a third position, the third flow control valve further configured to receive coolant from one of the lower head cooling jacket, the first flow control valve, and the second flow control valve and further configured to expel coolant to the coolant pump when occupying the second position and to expel coolant to the radiator when occupying the third position; and
wherein the coolant flowing through the engine water jacket and expelled from the IEM coolant outlet is in heat exchange relation with the cylinder head of the engine, which is in heat exchange relation with a heated exhaust gas flowing through the exhaust gas system, such that the coolant flowing through the engine water jacket absorbs heat from the heated exhaust gas via the cylinder head resulting in a heated coolant which is expelled from the IEM coolant outlet and selectively routed by the controller to one of the heater core, the engine oil heat exchanger, the transmission heat exchanger, and the radiator via the plurality of flow control valves.

2. The engine thermal management system of claim 1 wherein the exhaust gas system includes a plurality of exhaust gas runners and an exhaust gas outlet integrated with the integrated exhaust manifold of the engine, the exhaust gas outlet having an exhaust septum configured to bisect the exhaust gas outlet, the exhaust septum defining a plurality of exhaust gas ports associated with the exhaust gas runners.

3. The engine thermal management system of claim 2 wherein the engine water jacket is sized to substantially surround the exhaust gas runners and is configured to extract heat from each of the cylinder head and the exhaust gas septum.

4. The engine thermal management system of claim 2 wherein the engine water jacket further includes a middle cooling jacket disposed about and in heat exchange relation with the exhaust gas septum and configured to extract heat from the exhaust gas septum; and wherein the middle cooling jacket is configured to receive coolant from the lower head cooling jacket and expel coolant to upper head cooling jacket.

5. The engine thermal management system of claim 4 wherein the middle cooling jacket receives coolant from the lower head cooling jacket and the upper head jacket receives coolant from at least one of the coolant pump and lower head cooling jacket via the middle cooling jacket.

6. The engine thermal management system of claim 1 wherein the upper head cooling jacket receives coolant from the lower head cooling jacket.

7. The engine thermal management system of claim 1 wherein the upper head cooling jacket receives coolant from each of the lower head cooling jacket and the coolant pump.

8. The thermal management system of claim 1 wherein the first flow control valve occupies the closed position; wherein the third flow control valve occupies the first position; wherein the second flow control valve occupies the second position and expels warm coolant to the transmission heat exchanger and the engine oil heat exchanger via the mode selection valve occupying the first position; and wherein each of the engine oil heat exchanger and the transmission heat exchanger are configured to expel coolant to the radiator.

9. The thermal management system of claim 1 wherein the first flow control valve occupies the closed position; wherein the third flow control valve occupies the first position; wherein the second flow control valve occupies the third position and expels coolant exclusively to the heater core; and wherein the heater core is configured to receive coolant from the second flow control valve and expel coolant to the coolant pump.

10. The thermal management system of claim 1 wherein the first flow control valve occupies the open position and expels coolant to the third flow control valve; wherein the second flow control valve occupies the third position and expels coolant to each of the third flow control valve and the heater core; and wherein the third flow control valve occupies one of the second position and the third position, such that the third flow control valve expels coolant to the coolant pump when occupying the second position and expels coolant to the radiator when occupying the third position.

11. A method of engine thermal management for a vehicle having an exhaust gas system, a transmission, an engine with an integrated exhaust manifold (IEM), an engine thermal management system, and a controller configured to direct flow of a coolant through the engine thermal management system via a plurality of flow control valves, the method comprising the steps of:

actuating, via a controller, the plurality of flow control valves to occupy a fully closed position until the engine reaches a first predetermined temperature, wherein the plurality of flow control valves includes at least a first flow control valve actuated to occupy a closed position, a second flow control valve actuated to occupy a first position, and a third flow control valve actuated to occupy a first position;

signaling, via the controller, a coolant pump to start and to circulate coolant through the engine thermal management system after the engine reaches the first predetermined temperature;

actuating, via the controller, the second flow control valve to occupy a second position and actuating a mode selection valve to occupy a first position;

selectively directing, via the controller, warm coolant expelled from an IEM coolant outlet to each of an engine oil heat exchanger and a transmission heat exchanger, via the second flow control valve, wherein the warm coolant is delivered to the IEM coolant outlet by an engine water jacket, which is in heat exchange relation with a cylinder head of the engine, the cylinder head in heat exchange relation with a heated exhaust gas flowing through a plurality of exhaust gas runners, such that the warm coolant expelled from the IEM coolant outlet and directed to the engine oil heat exchanger and the transmission oil heat exchanger, via the second flow control valve, warms each of the transmission and an engine oil present in the engine respectively; and actuating, via the controller, the second flow control valve to occupy a third position, thereby directing coolant to a heater core to facilitate heating of a passenger compartment, when the engine oil reaches a predetermined temperature and the transmission reaches a predetermined temperature.

12. The method of claim 11 wherein the method further includes:

actuating, via the controller, the first flow control valve to occupy an open position and the second flow control valve to occupy a fourth position, thereby directing coolant from the second flow control valve to the third flow control valve, when a passenger compartment reaches a predetermined temperature; and selectively directing, via the controller, the coolant expelled from the third flow control valve to one of the coolant pump and the radiator, such that the coolant is directed from the third flow control valve to the coolant pump until the engine reaches a second predetermined temperature, and such that the coolant is directed from the third flow control valve to the radiator when the engine reaches the second predetermined temperature.

13. The method of claim 12 wherein the controller selectively directs coolant expelled from first flow control valve to the third flow control valve; wherein the controller selectively directs coolant expelled from the second control valve to each of the heater core and the third flow control valve; and wherein the third flow control valve is actuated to occupy the second position and expels coolant back to the coolant pump, in order to facilitate warming of the engine.

14. The method of claim 12 wherein the controller selectively directs coolant expelled from first flow control valve to the third flow control valve; wherein the controller selectively directs coolant expelled from the second control valve to each of the heater core and the third flow control valve; and wherein the third flow control valve is actuated to the third position, thereby directing coolant to the radiator in order to facilitate cooling of the engine.

15. The method of claim 14 further including the steps of:

actuating, via the controller, at least one on/off valve to occupy an open position, wherein the controller selectively directs coolant from the coolant pump to a turbocharger cooler via the at least one on/off valve to facilitate cooling of a turbocharger, the turbocharger cooler configured to receive coolant from the on/off valve and configured to expel coolant to the radiator; and actuating, via the controller, a mode selection valve to occupy a second position, wherein the mode selection valve receives coolant from the coolant pump and expels coolant to each of the engine oil heat exchanger and the transmission heat exchanger to facilitate cooling of each of the engine oil and the transmission.

16. The method of claim 11 wherein the exhaust gas system includes a plurality of exhaust gas runners and an exhaust gas outlet is integrated with a cylinder head of the engine, the exhaust gas outlet having an exhaust septum configured to bisect the exhaust gas outlet, the exhaust septum defining a plurality of exhaust gas ports.

17. The method of claim 16 wherein the engine water jacket substantially surrounds the exhaust gas runners and is configured to extract heat from each of the cylinder head and the exhaust gas septum; wherein the engine water jacket includes an upper head cooling jacket, a lower head cooling jacket, a middle cooling jacket, and an engine block cooling jacket; and wherein the upper head cooling jacket and lower head jacket are configured to extract heat from the cylinder head and the middle cooling jacket is configured to extract heat from the exhaust gas septum.

* * * * *